United States Patent
Colbourne et al.

(10) Patent No.: US 6,486,942 B1
(45) Date of Patent: Nov. 26, 2002

(54) METHOD AND SYSTEM FOR MEASUREMENT OF A CHARACTERISTIC OF LENS

(75) Inventors: Paul Colbourne, Nepean; Jian Jim Yang, Ottawa; Geoff Randall, Waterloo, all of (CA)

(73) Assignee: JDS Uniphase Inc., Nepean (CA)

( * ) Notice: Subject to any disclaimer, the term of this patent is extended or adjusted under 35 U.S.C. 154(b) by 174 days.

(21) Appl. No.: 09/618,274

(22) Filed: Jul. 18, 2000

(30) Foreign Application Priority Data

Aug. 4, 1999 (CA) .............................. 2279714

(51) Int. Cl.[7] .............................................. G01B 9/00
(52) U.S. Cl. ........................................ 356/124; 356/125
(58) Field of Search ........................... 356/124, 124.5, 356/125, 126, 127, 624, 614

(56) References Cited

U.S. PATENT DOCUMENTS

| | | | | |
|---|---|---|---|---|
| 4,749,247 A | * | 6/1988 | Large | 350/96.16 |
| 5,844,670 A | * | 12/1998 | Morita et al. | 356/124 |
| 6,236,453 B1 | * | 5/2001 | Ikezawa et al. | 356/124 |

OTHER PUBLICATIONS

European Search Report EP 00 30 6546.

* cited by examiner

*Primary Examiner*—Michael P. Stafira
(74) *Attorney, Agent, or Firm*—Neil Teitelbaum

(57) ABSTRACT

A method and system are provided for measuring a characteristic of a lens. By directing light to a lens, and receiving reflected light from a opposite end faces of the lens on an image plane, a determination from the focused spots on the image plane can be made as to a characteristic of the lens, such as its focal length.

23 Claims, 3 Drawing Sheets

METHOD AND SYSTEM FOR MEASUREMENT OF A CHARACTERISTIC OF LENS

FIELD OF THE INVENTION

This invention relates generally to lenses, and more particularly relates to the measurement of a characteristic such as the focal length of a rod lens.

BACKGROUND OF THE INVENTION

The precision of optical devices is directly related to the precision of the components used in the manufacture of such devices. For example, rod lenses, such as graded-index lenses are often used in the manufacture of optical devices and are often used within the devices themselves. These lenses are relatively inexpensive, compact, and useful as components in optical filters, and various other devices for coupling light from optical fibres, to components wherein a beam must be collimated. The typical configuration is a series arrangement of optical fibre, lens, component, lens, optical fibre, such that light exiting an optical fibre is collimated by the lens, the collimated beam propagates through the component, the collimated beam exiting the component is then focused, and is coupled back into an optical fibre. Hence there are instances when a lens of exactly a quarter pitch, i.e. a collimating lens is required, and, there are instances where graded-index lenses of other than a quarter pitch are required. For example some designs require a 0.23 pitch or a 0.26 pitch lens. The difficulty is that highly accurate methods of measuring the pitch or gradient of a graded-index lens are not commercially available. A method of measuring one or more lenses simply and at a reasonable cost, with precision of up to ±0.0002 for pitch and ±0.0002 mm$^{-1}$ for Root A would be desirable. Currently, suppliers of lenses profess to provide accuracy of ±0.0005 mm$^{-1}$ for Root A.

It is therefore an object of this invention to provide a system and method for measuring lens Root A with accuracy up to ±0.0002 mm$^{-1}$.

It is a further object of the invention to provide a measurement system that is relatively inexpensive to manufacture and easy to use that will provide a relatively high degree of accuracy for measuring focal length of a graded-index lens.

SUMMARY OF THE INVENTION

In accordance with this invention there is provided, a method of determining a characteristic of a graded-index lens comprising the steps of:

receiving light from two end faces of a graded-index lens within a distant light receiving/detection region;

locating a first focus spot from light received from one of the two end faces; locating a second focus spot from the other of the two end faces of the lens;

and determining a characteristic of the graded-index lens from a distance traversed to locate the two focus spots.

In accordance with another aspect of this invention there is provided, an optical system for measuring a characteristic of a lens related to its focal length or its gradient, comprising:

means for temporarily holding the lens during testing thereof;

a light source for irradiating the lens;

a beam splitter for directing light that has been received from the lens to an image plane;

means for relatively moving the lens and the image plane to vary a distance therebetween; and, means for determining the varied distance.

BRIEF DESCRIPTION OF THE DRAWINGS

Exemplary embodiments of the invention will now be described in conjunction with the drawings in which.

DETAILED DESCRIPTION

Figure 1A:
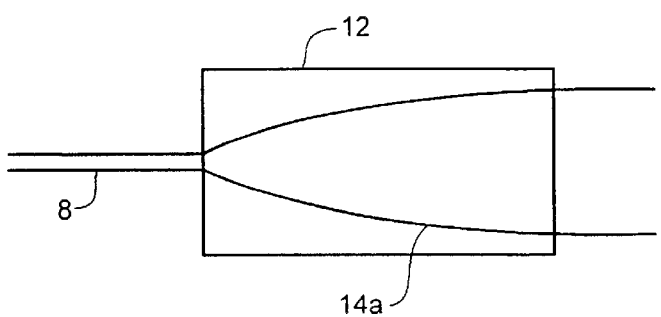
FIG. 1a is a side view of a quarter pitch collimating graded-index rod lens showing a beam of light launched into an end thereof from an optical fibre, wherein the optical fibre is coaxial with the optical axis of the lens.

FIGS. 1a through 1d show graded-index rod lenses of various pitch. The pitch of the lens shown in FIG. 1a is 0.25. A quarter-pitch rod lens 12 of this type provides a collimated beam when light is launched into either end via an optical fibre 8. However, in this example, light launched into a left end of the lens is shown to produce a collimated beam at an opposite right end. In FIG. 1a the beam is shown to exit the lens and there is no indication in this figure of back reflections that do occur when the light exits such a lens and is incident upon a medium of a different refractive index such as air. Back reflections due to the lens air interface are typically unwanted and anti-reflection coatings are generally applied to end faces of the lens to lessen these reflections. Notwithstanding, it will become apparent that these back reflections fulfill a useful role within the context of this invention.

Figure 1B:
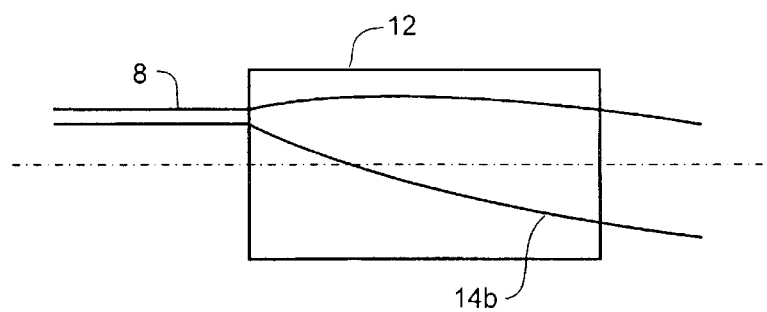
FIG. 1b is a side view of a quarter pitch collimating graded-index rod lens showing a beam of light launched into an end thereof from an optical fibre, wherein the longitudinal axis of the optical fibre is offset from the optical axis of the lens.
Figure 1C:
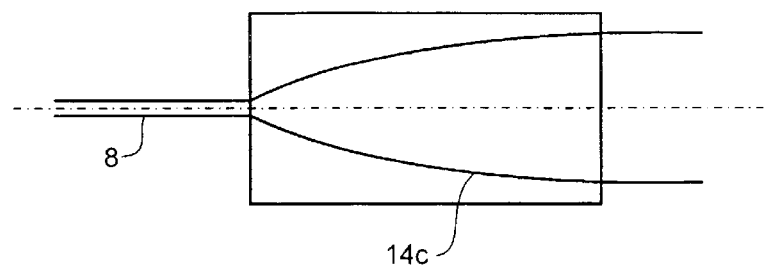
FIG. 1c is a side view of a 0.23 pitch lens showing a beam launched into an end from an optical fibre.
Figure 1D:
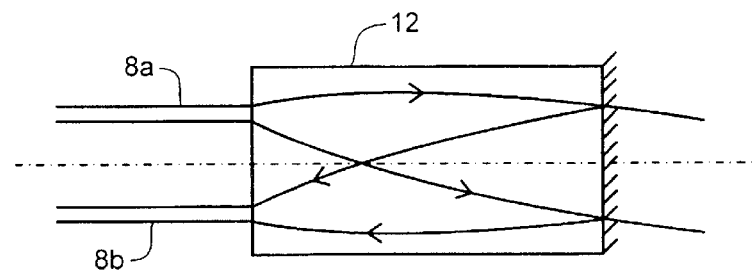
FIG. 1d is a side view of a quarter pitch lens showing two optical fibres offset from the optical axis.

FIGS. 1a and 1b illustrate a different path followed by light launched into a same lens at different locations. FIG. 1c illustrates a less than quarter pitch lens and shows the exiting beam diverging rather than being collimated. FIG. 1d illustrates light launched into a lens 12 from an optical fibre 8a, wherein some light is collimated and some light reflects backward to a receiving optical fibre 8b. With an understanding of graded-index rod lenses, various embodiments of this invention, for example, based on the arrangements shown in FIG. 1a and FIG. 1d are described.

Referring once again to FIG. 1a, light 14a is shown launched into the lens 12 along the optical axis of the lens. When some light is reflected backward off the end face of the lens, it is coupled back into the optical fibre 8.

Figure 1E:
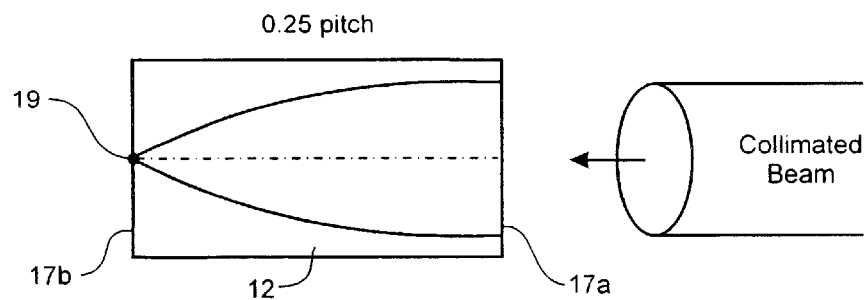
FIG. 1e is a side view showing a collimated beam launched into an end of a quarter pitch lens.

In FIG. 1e, a collimated beam is shown launched into an end 17a of the lens 12; and, since the lens is a quarter pitch collimating lens, the light is focused at and end face 17b of the lens at a location 19 on the optical axis.

Figure 1F:
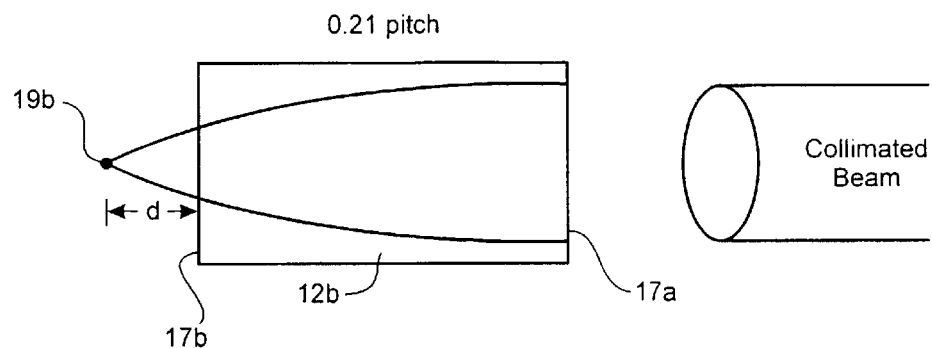
FIG. 1f is a side view showing a collimated beam launched into an end of a 0.21 pitch lens; and, FIG. 2 is a block diagram of an optical circuit in accordance with this invention for measuring a characteristic of a lens under test.

In FIG. 1*f*, a collimated beam is shown launched into an end 17*a* of the lens 12*b*; since the lens is less than a quarter pitch (0.21), the focus spot is a distance "d" away from the end face 17*b* of the lens, in this instance at location 19*b*.

By determining the distance "d" the focal length of the lens can be calculated.

Although this method of calculating a characteristic such as focal length of the lens is useful and produces moderately accurate results, a preferred embodiment of this invention, obviates the requirement of comparing the focal length of two lenses, by utilizing both end faces of the graded-index rod lens to determine the focal length. In this manner, there is no need to ensure identical conditions in two separate instances, once on a first reference lens, and once on a lens under test.

Figure 2:
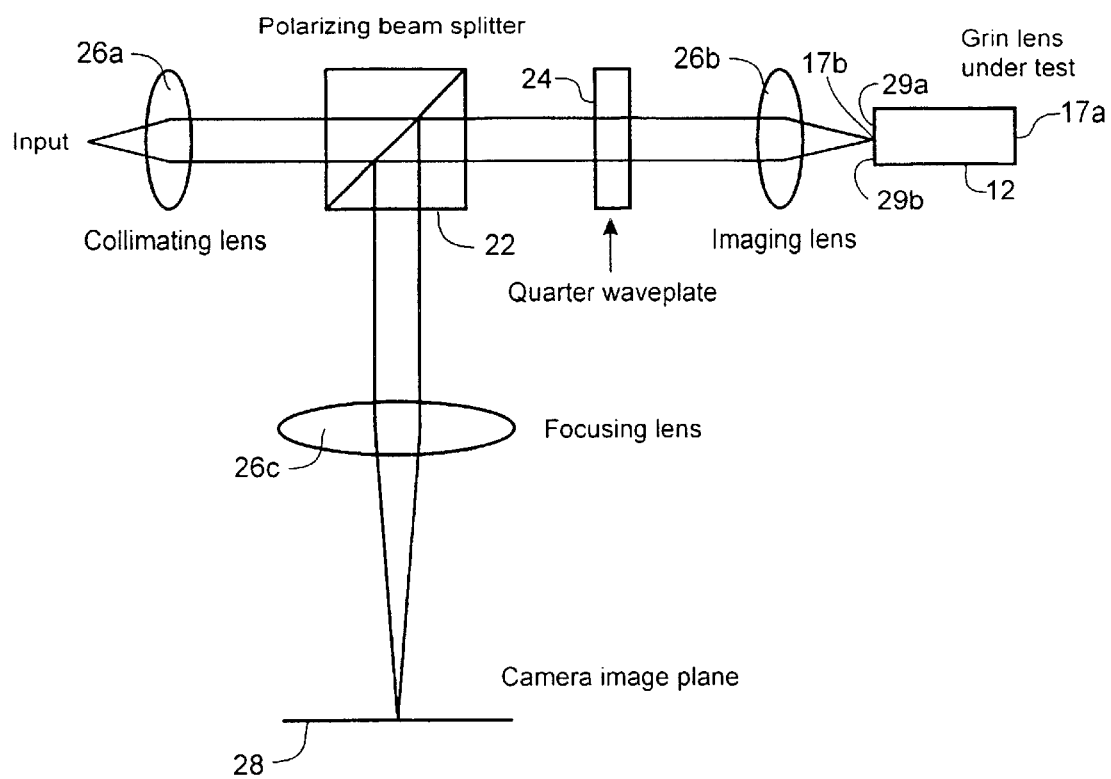

Referring now to FIG. 2 a preferred embodiment of the invention is provided, wherein a lens 12 under test is secured in a holder not shown that is relatively moveable with a camera image plane 28. A polarization beam splitter (PBS) 22 is disposed near a first end where preferably polarized light of a particular polarization is launched into the device. Collimating/focusing lenses 26*a*, 26*b*, and 26*c* provide collimated/focused beams where required. A quarter wave plate 24 is disposed between the PBS 22 and the lens 12 under test.

In operation, collimated polarized light at a wavelength of interest is launched into the system through polarization maintaining optical fibre and is directed to PBS 22 where it is passed therethrough due to its polarization state. The polarization of the beam is then rotated by the quarter wave plate 24 to become circular polarization, and the beam is focused at a location 29*a* by the imaging lens 26*b* at an end face of the lens 12 under test. Although not clearly illustrated in this figure, in this embodiment the focus spot 29*a* of the beam launched from the input end on the end face 17*b* of the lens is slightly offset from the optical axis of the lens 12. Since the end face 17*b* of the lens 12 is partially reflective, and partially transmissive, a small portion of the beam at location 29*a* is reflected backward toward the PBS 22 after having its polarization further rotated by the wave plate 24. Since the polarization state of the beam has twice been rotated by the wave plate 24 and has undergone a transformation from vertically polarized light, to horizontally polarized light, it is directed toward and through the focusing lens 26*c* toward the camera image plane 28. Simultaneously, a portion of the light that was not reflected by the end face 17*b* of the lens 12 propagates through the lens 12 and a portion thereof is reflected backwards toward the end face 17*b*. If the lens 12 is a perfect quarter pitch lens, the focus spot 29*b* from light reflecting backward from the end face 17*a* will be on the end face 17*b* of the lens 12. Otherwise, if the lens is more or less than a quarter pitch, the focus spot will be within or outside of the lens 12, respectively. As the light from focus spot 29*a* was reflected back toward the image plane 28, the light from focus spot 29*b* is similarly reflected back toward the image plane 28. By relatively moving the lens 12 and the image plane to determine the location of the image of the focus spots 29*a* and 29*b* on the image plane, a focal length of the lens can be calculated from the relative movement between the lens and the image plane. For example, if the image plane is stationary, and the lens is moved from a first position to a second, after finding the first focus location and then the second, corresponding to the first and second positions respectively, the pitch of the lens can be calculated. Similarly if the lens is stationary the image plane can be moved appropriately to determine the focal length of the lens.

An important step in the operation of the invention is to determine when the light from focus spots 29*a* and 29*b* are focussed onto the image plane 28. A convenient way to accomplish this is to place a video camera or other imaging device at the image plane 28. The best focus can be determined by looking for the minimum spot size, or the maximum peak light intensity at the center of the imaged spot. In the preferred embodiment, a computer equipped with image acquisition capability and image processing software controls the movement of the graded index lens relative to the imaging lens 26*b*, and determines the lens positions corresponding to best focus at the imaging plane of the spots 29*a* and 29*b* respectively. The difference between these two lens positions corresponds to the lens front focal length FS.

Although the embodiment describes the spots 29*a* and 29*b* as being slightly offset from the optical axis of the lens 12, alternatively, light launched into the face 17*b* can be directly on the optical axis, and light reflecting from face 17*a* would similarly follow a same path along the optical axis. The only significant effect of this arrangement is that if the lens was a perfect quarter pitch lens, the two spots on the image plane imaging the front and rear faces of the lens 12 would be coincident. In this instance providing a collimated light source at the face 17*a* directed into the lens, would provide a means of verification that the lens was indeed a quarter pitch lens. If the intensity of the two coincident spots varied this would indicate coincidence.

In the preferred embodiment shown a PBS 22 and a quarter wave plate 24 are provided for efficient utilization of light and to minimize unwanted reflections. However, in a less preferred embodiment, a splitter an non-polarized light could be provided. Although some light would be diverted toward the image plane that was not related to the lens 12, care could be taken to discern the image of the two spots of the lens faces on the image plane.

The system described heretofore, in accordance with the invention measures the difference in the focusing distance along the focusing direction between the two spots form the front surface and the back surface of the lens. This is the focal length (FS) of the graded-index lens under test. FS is related to the squared root of A and the length pitch in the following formula:

$$FS = \cos(\sqrt{A})/NO(\sqrt{A}\sin(Z\sqrt{A})) \quad (1)$$

$$\text{Pitch} = Z\sqrt{A}/2\pi \quad (2)$$

where No is the on-axis refractive index of the lens and Z is the on-axis length of the lens. Pitch and the square root of A can be determined after measuring Z and FS.

Of course, numerous other embodiments of the invention can be envisaged, without departing from the sprit and scope of the invention.

What is claimed is:

1. A method of determining a characteristic of a graded-index lens comprising the steps of:

receiving light from two end faces of a graded-index lens within a distant light receiving/detection region;

locating a first focus spot from light received from one of the two end faces; locating a second focus spot from the other of the two end faces of the lens;

and determining a characteristic of the graded-index lens from the locations of the two focus spots.

2. A method as defined in claim 1, wherein the characteristic is related to the focal length of the graded-index lens.

3. A method as defined in claim 1 wherein the characteristic is related to the gradient of the graded-index lens.

4. A method as defined in claim 1, further comprising the step of irradiating both faces of the graded-index lens with a same light source.

5. A method as defined in claim 1, further comprising the step of irradiating each face of the graded-index lens with a different light source.

6. A method as defined in claim 4, wherein the light is directed onto a first image plane.

7. A method as defined in claim 6 wherein the steps of locating a first focus spot and locating a second focus spot include the step of relatively varying the distance between the lens and the first image plane.

8. A method as defined in claim 1 wherein the steps of locating a first focus spot and locating a second focus spot include the step of relatively varying the distance between the lens and the detection region.

9. A method as defined in claim 7 wherein the step of relatively varying the distance includes the step of varying the position of the lens, to vary the optical path length between the lens and the first image plane.

10. A method as defined in claim 7 wherein the step of relatively varying the distance includes the step of varying the position of the image plane, to vary the optical path length between the lens and the first image plane.

11. A method as defined in claim 6, wherein the light source provides substantially polarized light to the lens.

12. A method as defined in claim 11, wherein the light source provides at least a known wavelength of light to the lens.

13. A method as defined in claim 11, further comprising the step of passing the substantially polarized light through a beam splitter prior to providing the light to the lens.

14. A method as defined in claim 13, wherein the beam splitter is a polarization beam splitter that passes light having a first polarization and reflects orthogonally polarized light.

15. A method as defined in claim 14 further comprising the step of passing the polarized light through a wave plate to rotate the polarization of light passing therethrough.

16. An optical system for measuring a characteristic of a lens related to its focal length or its gradient, the lens having a partly reflective front end face and a reflective rear end face, the system comprising:

means for temporarily holding the lens during testing thereof;

a light source for irradiating the lens;

a beam splitter for directing light that has been received from the lens to an image plane;

means for relatively moving the lens and the image plane to vary a distance therebetween;

means for locating a first focus spot from light received from one of the two end faces and for locating a second focus spot from the other of the two end faces of the lens; and means for determining a characteristic of the lens from location of the two focus spots.

17. An optical system for measuring a characteristic of a lens as defined in claim 16 further comprising means for automatically determining the measured characteristic.

18. An optical system for measuring a characteristic as defined in claim 17, wherein the means for automatically determining the measured characteristic includes a suitably programmed processor.

19. An optical system as defined in claim 16 wherein the light source is for providing polarized light, and wherein the beam splitter is a polarization beam splitter.

20. An optical system as defined in claim 19 further comprising a non-reciprocal rotator for varying the polarization of light passing therethrough, the non-reciprocal rotator being disposed between the polarization beam splitter and the lens.

21. An optical system as defined in claim 20 wherein a CCD or video camera is disposed along the image plane.

22. The optical system of claim 16 wherein the lens has a flat reflective rear end face.

23. A method of determining a characteristic of a graded-index lens comprising the steps of:

receiving light from two end faces of a graded-index lens within a distant light receiving/detection region;

locating a first focus spot from light received from one of the two end faces; locating a second focus spot from the other of the two end faces of the lens;

and determining a characteristic of the graded-index lens from a distance traversed to locate the two focus spots.

* * * * *